Sept. 23, 1930.   A. KAHLOW ET AL   1,776,588
ANTISKID DEVICE
Filed May 13, 1929

Inventor
A. Kahlow
W. H. Markham

Patented Sept. 23, 1930

1,776,588

UNITED STATES PATENT OFFICE

ARTHUR KAHLOW, OF MAYVILLE, AND WILLIAM H. MARKHAM, OF HORICON, WISCONSIN

ANTISKID DEVICE

Application filed May 13, 1929. Serial No. 362,768.

This invention relates to new and useful improvements in anti-skid devices.

One of the objects of our invention is the provision of a novel form of anti-skid device which can be quickly and readily applied to a pneumatic vehicle tire and wherein the parts of the anti-skid device are of such construction that the device will readily conform to the shape of the tire and assume the shape of a tire when the same is depressed while passing over rough and uneven roads so that the device will at all times be closely fitted to the tire.

Another object of our invention is the provision of an anti-skid device wherein the side parts as well as the cross parts are rubber covered with the cross parts having the core or body thereof formed of fabric to provide for a maximum amount of yieldability and the cross parts carry suitable lugs arranged at spaced intervals forming the anti-skid tread for the device, while the side parts have the body or core thereof formed of cable-like structure so that securing chains or straps may be readily engaged with the side parts for retaining the device against displacement relative the vehicle tire.

Figure 1:
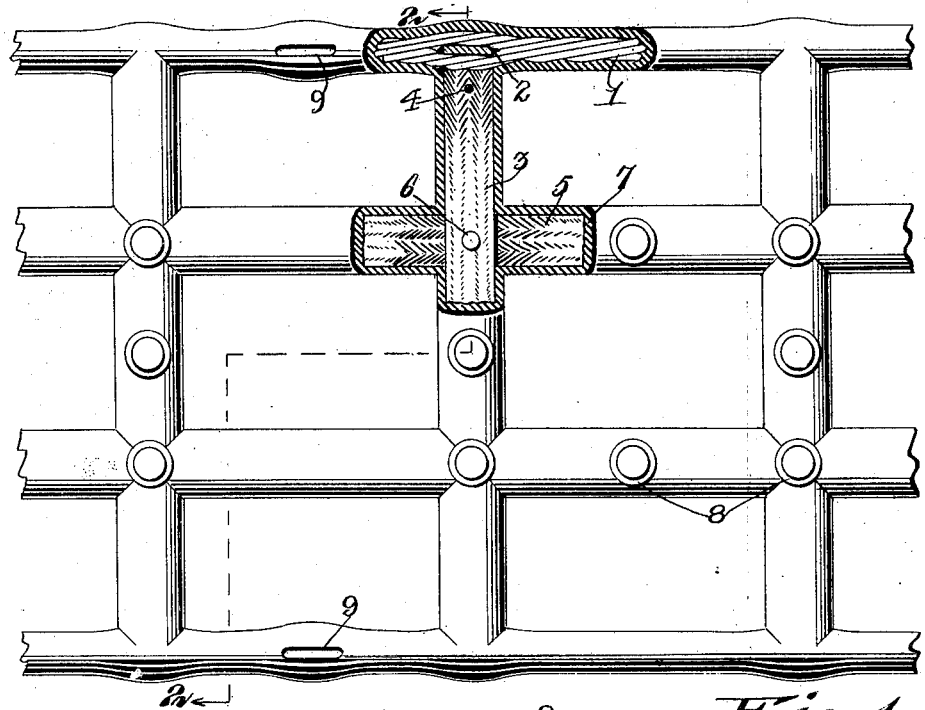
Figure 2:
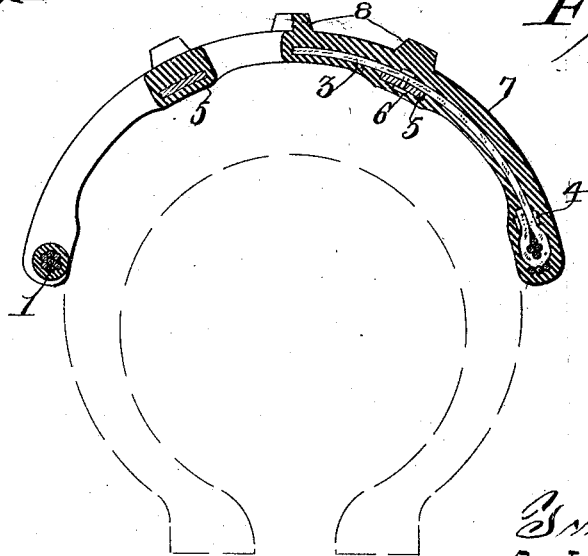

A further object of the invention is the provision of an anti-skid device adapted to be applied to vehicle tires wherein the cross parts or intermediate portion of the device is comparatively flexible so that the same will readily assume the shape of the vehicle tire at all times and the side parts thereof can be readily clamped against the side walls of the tire to prevent displacement of the device, it being understood that the device is preferably applied when the Figure 1 is a plan view of a portion of an anti-skid device constructed in accordance with our invention with parts thereof broken away and illustrated in cross section; and Figure 2 is a transverse section on the line 2—2 of Figure 1.

In carrying out our invention, it will be noted that the side parts comprise a plurality of strands of wire twisted together to form the side cables 1. These side cables are provided at intervals with openings or slits 2, through which the ends of the transverse fabric of the strips 3 are passed. The fabric strips 3 have their ends passed through the slits 2 and folded over with rivets 4 used for securely connecting the strips 3 to the side cables 1.

Extending parallel with the cables 1 and preferably upon opposite sides of the longitudinal center between said cables are the longitudinal fabric strips 5. These longitudinal strips 5 are secured to the cross strips 3 by means of rivets, as shown at 6, so that when the cross strips and longitudinal strips are arranged in position they can be riveted together and retained against movement relative each other.

The longitudinal strips 5 are arranged in spaced parallel relation and in spaced parallel relation with the side cables 1, as shown in Figure 1, and all of the members including the side cables 1 and transverse strips 3 and the longitudinal strips 5 are enclosed within a rubber casing 7.

This rubber casing is so formed that the exterior of the side cables as well as the transverse and longitudinal strips present a substantially rounded appearance and the outer surface of the transverse and longiin Figure 2, when the tire is deflated, thus when the tire is inflated, the outer side walls of the tire will have a tendency to cause the cable-like side portions 1 to create an inward pressure on the exterior of the tire so as to tightly grip the tire and hold the anti-skid device in place.

Further means is provided for retaining the device in place by forming the cables 1, as well as the casing therefor, with transverse slots 9 through which attaching straps or chains may be passed, said attaching straps or chains being adapted to pass around upon the inner side of the felloe of the wheel so as to securely retain the device against transverse movement.

In view of the fact that the transverse and longitudinal strips 3 and 5, respectively, are formed of fabric provided with a rubber casing, it will be noted that a considerable amount of yieldability is incorporated in the make-up of the device so that the same will assume various shapes of the vehicle tire, particularly where the tire passes over rough and uneven places so that the anti-skid device is at all times in close contact with the exterior of the tire tread assuring positive contact of the anti-skid device with the surface over which the tire is traveling, whether it be a smooth, even surface, or a rough and broken surface.

One of the particular features of this improved anti-skid device is the fact that by using a fabric for the intermediate portion of the device, the same can be manufactured at a very low cost and at the same time retain the yieldable qualities and flexibility required of anti-skid devices of the type described above.

Another feature is the fact that when the device is provided with the rubber casing 7, the rubber will adhere more solidly to the fabric core than would be the case if metal were used.

It will also be noted that through the formation of the side cables 1, the rubber casing, when applied in a plastic state, will have a tendency to embed itself in the grooves or channels formed by the strands of the cable, thus securely maintaining the rubber casing against movement relative the cables. This has been one of the objections of certain types of anti-skid devices wherein the cross parts and the like are of metal.

It is believed from the foregoing, that we have provided a comparatively simple and inexpensive anti-skid device of very simple construction wherein the parts which go to make up the device can be cheaply manufactured, but at the same time a finished anti-skid device will be produced which will be equally as efficient as any similar devices on the market at the present time.

It will be apparent that when the casing is applied to the longitudinal and transverse strips as well as the cable 1, the projections 8 are integrally formed with the casing, they being molded in the operation.

While we have shown and described the preferred embodiment of our invention, it will be apparent that slight changes may be made in the construction when putting the invention into practice without departing from the spirit of the same or the scope of the appended claims.

We claim:

1. In an anti-skid device, cable-like side members having a plurality of spaced slots therethrough, a plurality of transverse fabric strips having their ends secured in said slots and longitudinal fabric strips between the side cables and connected to the transverse fabric strips and said side cables, transverse strips and longitudinal strips being enclosed in a rubber casing.

2. In an anti-skid device, cable-like side members formed of a plurality of twisted strands of wire, transverse fabric members arranged in spaced relation with their ends engaged with the strands of the side cables and secured thereto, longitudinal fabric members arranged in spaced relation with each other and with the side cables and connected to the transverse members and a rubber casing for said side cables and the transverse and longitudinal members.

3. In an anti-skid device, cable-like side members having a plurality of spaced slots therethrough, a plurality of transverse fabric strips having their ends secured in said slots, longitudinal fabric strips between the side cables and traversing the transverse fabric strips and lying parallel with the side cables, said transverse strips, side cables and longitudinal strips being enclosed in a rubber casing, and means for securing said transverse and longitudinal strips where they cross each other.

In testimony that we claim the foregoing we have hereunto set our hands at Mayville and Horicon, respectively, in the county of Dodge and State of Wisconsin.

ARTHUR KAHLOW.
WILLIAM H. MARKHAM.